US010918237B2

United States Patent
Bolognese et al.

(10) Patent No.: US 10,918,237 B2
(45) Date of Patent: Feb. 16, 2021

(54) SYSTEM FOR THE PREPARATION OF BEVERAGES WITH THE USE OF CAPSULES

(71) Applicant: LUIGI LAVAZZA S.p.A., Turin (IT)

(72) Inventors: Danilo Bolognese, Torinio (IT); Alberto Cabilli, Moncalieri (IT); Luisa Anna Borello, Turin (IT)

(73) Assignee: LUIGI LAVAZZA S.P.A., Turin (IT)

( * ) Notice: Subject to any disclaimer, the term of this patent is extended or adjusted under 35 U.S.C. 154(b) by 256 days.

(21) Appl. No.: 16/075,740

(22) PCT Filed: Feb. 10, 2017

(86) PCT No.: PCT/IB2017/050730
§ 371 (c)(1),
(2) Date: Aug. 6, 2018

(87) PCT Pub. No.: WO2017/137933
PCT Pub. Date: Aug. 17, 2017

(65) Prior Publication Data
US 2019/0075959 A1    Mar. 14, 2019

(30) Foreign Application Priority Data

Feb. 12, 2016 (IT) .......................... 102016000014612

(51) Int. Cl.
*A47J 31/36* (2006.01)
*A47J 31/06* (2006.01)

(52) U.S. Cl.
CPC ....... *A47J 31/3628* (2013.01); *A47J 31/0673* (2013.01); *A47J 31/3695* (2013.01)

(58) Field of Classification Search
CPC ................ A47J 31/3628; A47J 31/3623; A47J 31/3695; A47J 31/369; A47J 31/0673; A47J 31/0668
(Continued)

(56) References Cited

U.S. PATENT DOCUMENTS 6,499,388 B2 * 12/2002 Schmed .............. A47J 31/3623
99/295
7,153,530 B2 * 12/2006 Masek ............... B65D 85/8043
426/77
(Continued)

FOREIGN PATENT DOCUMENTS

CA      2874713 C  *  7/2018 ............... A23F 5/26
WO  2008/015642 A3    2/2008
(Continued)

OTHER PUBLICATIONS

International Search Report for PCT/IB2017/050730 dated Apr. 3, 2017 [PCT/ISA/210].
(Continued)

*Primary Examiner* — Reginald Alexander
(74) *Attorney, Agent, or Firm* — Sughrue Mion, PLLC

(57) ABSTRACT

A system for the preparation of beverages with the use of capsules including an infusion assembly (1) and a capsule (C). The infusion assembly includes a capsule-holder (2) and a cooperating body (3), adapted to assume an open configuration for positioning a capsule (C) therebetween, and a closed configuration for preparing a beverage through the capsule (C) clamped in a liquid-tight manner therebetween. In the capsule-holder (2) there is defined a recess (4) adapted to receive the capsule (C) with the bottom wall (20a, 20f) facing the interior of the capsule-holder (2) and wherein is provided a first piercing member (8) provided with at least a piercing point (9) adapted to penetrate through the bottom wall (20a) of said capsule (C). The capsule-holder (2) is adapted to supply a flow of fluid introduced into the capsule (C) through the tear created in its bottom wall (20a) from the at least one point (9). In the cooperating body (3) a dispensing conduit (13) is defined for the beverage and a second piercing member (14) is provided, having at least one point (16) adapted to penetrate through the cover (21) of the
(Continued)

capsule (C) to allow the outflow of the beverage from the capsule (C) towards said dispensing conduit (13). In the capsule-holder (2) there are provided fluid communication passages (8*c*; 8*d*; 11), which put into communication a region upstream of the first piercing member (8) such that, during the preparation of a beverage, the fluid introduced into the recess (4) of the capsule-holder (2) exerts on the first piercing member (8) a force lower than a predetermined value towards the capsule (C), the first piercing member (8) being mounted in the recess (4) of the capsule-holder (2) such as to be movable under the action of a spring (10) tending to displace it towards the cooperating body (3).

5 Claims, 9 Drawing Sheets

(58) Field of Classification Search
USPC .................................................. 99/295, 284
See application file for complete search history.

(56) References Cited

U.S. PATENT DOCUMENTS

| | | | |
|---|---|---|---|
| 7,216,582 B2* | 5/2007 | Yoakim | A47J 31/0668 99/295 |
| 7,798,055 B2* | 9/2010 | Mandralis | A47J 31/36 99/295 |
| 8,770,095 B2* | 7/2014 | Pecci | A47J 31/3633 99/295 |
| 9,661,948 B2* | 5/2017 | Mariller | A47J 31/0673 |
| 2014/0130678 A1* | 5/2014 | Frydman | A47J 31/407 99/295 |
| 2015/0230652 A1* | 8/2015 | Chalk | A47J 31/0684 99/295 |
| 2016/0068336 A1* | 3/2016 | Biesheuvel | A47J 31/407 426/115 |
| 2016/0176625 A1* | 6/2016 | Brockman | A47J 31/5251 99/295 |

FOREIGN PATENT DOCUMENTS

| | | |
|---|---|---|
| WO | 2010/029512 A1 | 3/2010 |
| WO | 2016/103104 A1 | 6/2016 |

OTHER PUBLICATIONS

Written Opinion for PCT/IB2017/050730 dated Apr. 3, 2017 [PCT/ISA/237].

* cited by examiner

SYSTEM FOR THE PREPARATION OF BEVERAGES WITH THE USE OF CAPSULES

CROSS REFERENCE TO RELATED APPLICATIONS

This application is a National Stage of International Application No. PCT/IB2017/050730 filed Feb. 10, 2017, claiming priority based on Italian Patent Application No. 102016000014612 filed Feb. 12, 2016.

BACKGROUND OF THE INVENTION

Field of the Invention

The present invention relates generally to the preparation of beverages, such as espresso coffee, with the use of pre-packaged capsules.

The present invention relates in particular to a system for the preparation of a beverage with the use of a sealed capsule containing a substance for the preparation of the beverage having a predetermined axial size or height and comprising a cup-shaped body with a bottom wall and a tearable closing cover for the introduction into the capsule of a flow of liquid under pressure and, respectively, for the outflow of the beverage.

Background

More specifically, the invention relates to a system for the preparation of a beverage having an infusion assembly comprising
  a capsule-holder and an associated cooperating body, at least one of which is movable with respect to the other, between an open configuration for positioning a capsule therebetween, and a closed configuration for preparing a beverage through the capsule positioned and clamped in a liquid-tight manner therebetween; wherein
  in the capsule-holder there is defined a recess adapted for receiving a capsule with the bottom wall facing the inside of the capsule-holder and wherein there is defined a first piercing member provided with at least one point adapted to penetrate through said bottom wall of said capsule, the capsule-holder being provided with a means for supplying a flow of a fluid to be introduced into said capsule through the passage torn in said bottom wall of the capsule by said at least one point; and
  in the cooperating body there is defined a dispensing conduit for the beverage and a second piercing member is provided, having at least one point adapted to penetrate through the cover of said capsule and to allow the outflow of the beverage from the capsule toward said dispensing conduit.

A system of the above-mentioned type is known from WO 2010/029512.

It is an object of the present invention to provide an improved system for the preparation of a beverage, which has a simple structure and economic construction, ensures a reliable operation and is able to operate with capsule having different heights.

SUMMARY OF THE INVENTION

This and other objects are achieved according to the invention with a system for the preparation of a beverage comprising an infusion assembly and a capsule, the capsule comprising
  a cup-shaped body of a material impermeable to liquids, with a bottom wall, which is tearable for introducing into the capsule a flow of a pressurized fluid, with a side wall defining an opening around which a flange-like formation protruding transversely towards the outside extends, and with a cover, which is tearable for the outflow of the beverage, the cover being connected in a liquid-tight manner with said flange-like formation, and
  a quantity of a substance for the preparation of the beverage contained in said cup-shaped body;
  the infusion assembly comprising
  a capsule-holder and a cooperating body, at least one of which is movable with respect to the other between an open configuration for positioning the capsule between the capsule-holder and the cooperating body, and a closed configuration for preparing the beverage through the capsule positioned and clamped in a liquid-tight manner between the capsule-holder and the cooperating body;
  wherein in the capsule-holder there is defined a recess for receiving the capsule with said bottom wall facing to the inside of the capsule-holder and wherein there is defined a first piercing element provided with at least one piercing point adapted to penetrate through said bottom wall of said capsule; the capsule-holder being provided with supply means for supplying a flow of a fluid to be introduced into said capsule through the passage torn in said bottom wall of the capsule by said at least one point;
  wherein in the cooperating body there is defined a dispensing conduit for the beverage and a second piercing element is provided, having at least one point adapted to penetrate through the cover of the capsule and to allow the outflow of the beverage from the capsule towards said dispensing conduit;
  wherein in the capsule-holder there are provided fluid communication means which put into communication a region upstream with a region downstream of the first piercing member in the operational path of said flow of fluid, such that during the preparation of a beverage the pressurized fluid introduced into said recess of the capsule-holder exerts on the first piercing member a resulting force lower than a predetermined value towards the capsule, and in particular a resulting force which is null, said first piercing member being mounted in the recess of the capsule-holder such as to be movable under the action of an associated resilient means tending to displace it towards the cooperating body, and
  wherein the bottom wall of the cup-shaped body of the capsule has a central portion of reduced thickness, surrounded by a relatively thicker annular peripheral portion, and the side wall of the cup-shaped body of the capsule has a thickness greater than that of said central portion of the bottom wall of the cup-shaped body of the capsule.

Due to these features, in the infusion assembly of a system according to the present invention the first piercing member associated with the capsule-holder is almost exclusively subjected in operation to the force of the associated resilient means, the hydraulic forces acting on it being substantially in equilibrium with each other.

Furthermore, the system is able to operate with capsules of at least two different types, different from each other essentially in that they have different heights (i.e. different axial sizes).

BRIEF DESCRIPTION OF THE DRAWINGS

Further features and advantages of the present invention will become apparent from the detailed description that follows, provided by way of non-limiting example with reference to the accompanying drawings, wherein.

DETAILED DESCRIPTION OF THE INVENTION

Figure 1:
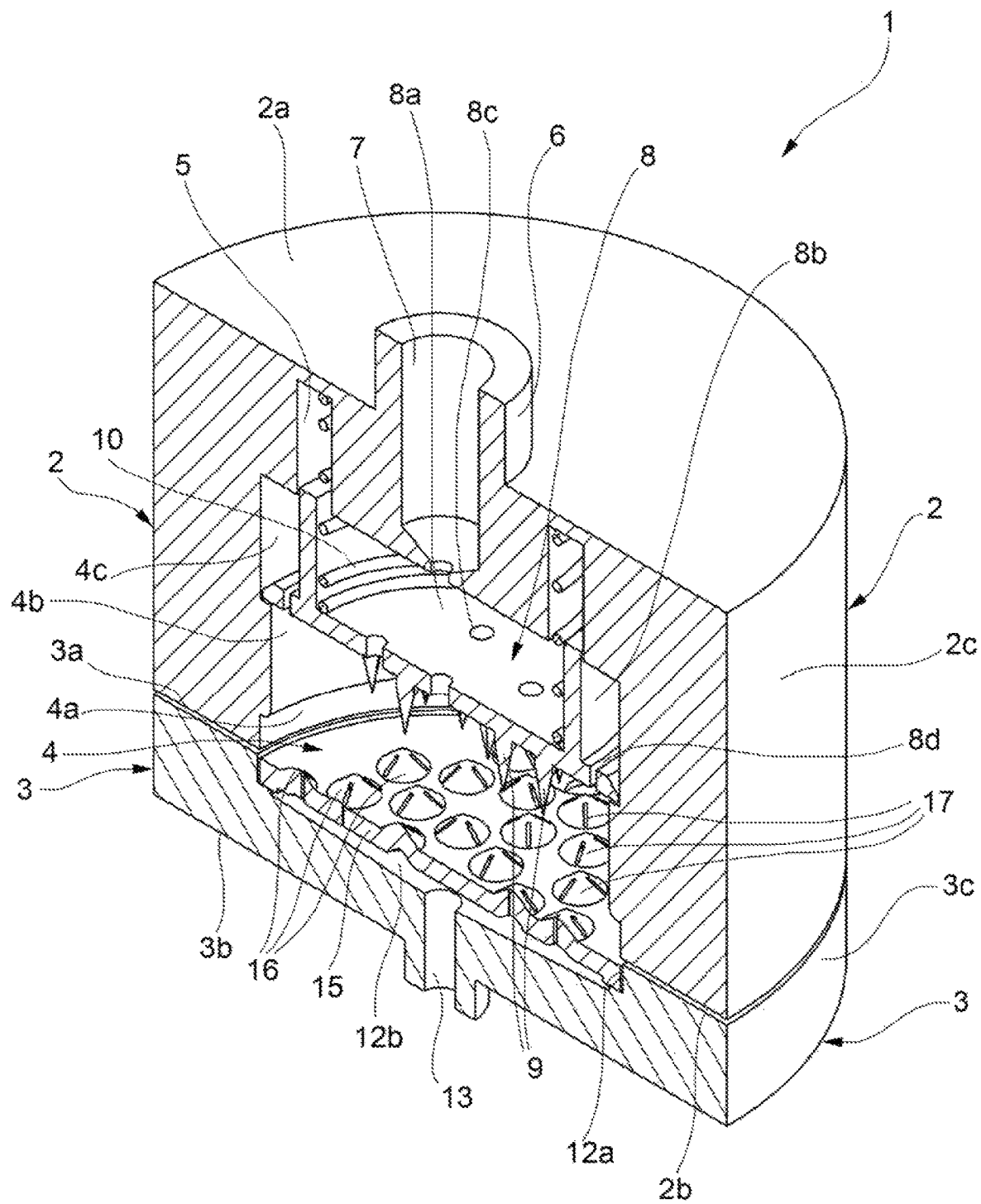
FIG. 1 is an axial section perspective view of an infusion assembly of a system for the preparation of a beverage according to the present invention.

In the drawings, and in particular in FIGS. 1, 2, 5, 6, 9 and 12, an infusion assembly of a system for preparing beverages according to the present invention is generally indicated at 1.

Such infusion assembly 1 essentially comprises a capsule-holder 2 and an associated cooperating body 3.

In the illustrated embodiment the capsule-holder 2 has an essentially cylindrical-type general configuration, with an upper flat surface or face 2a, a lower flat surface or face 2b and a cylindrical side surface 2c (see in particular FIG. 1). In this embodiment, also the associated cooperating body 3 has a substantially cylindrical configuration of reduced height or thickness with an upper flat surface or face 3a, a lower flat surface or face 3b and a cylindrical side surface 3c.

In the capsule-holder 2, starting from its lower flat surface or face 2b, a recess indicated collectively at 4 extends upwards.

Figure 2:
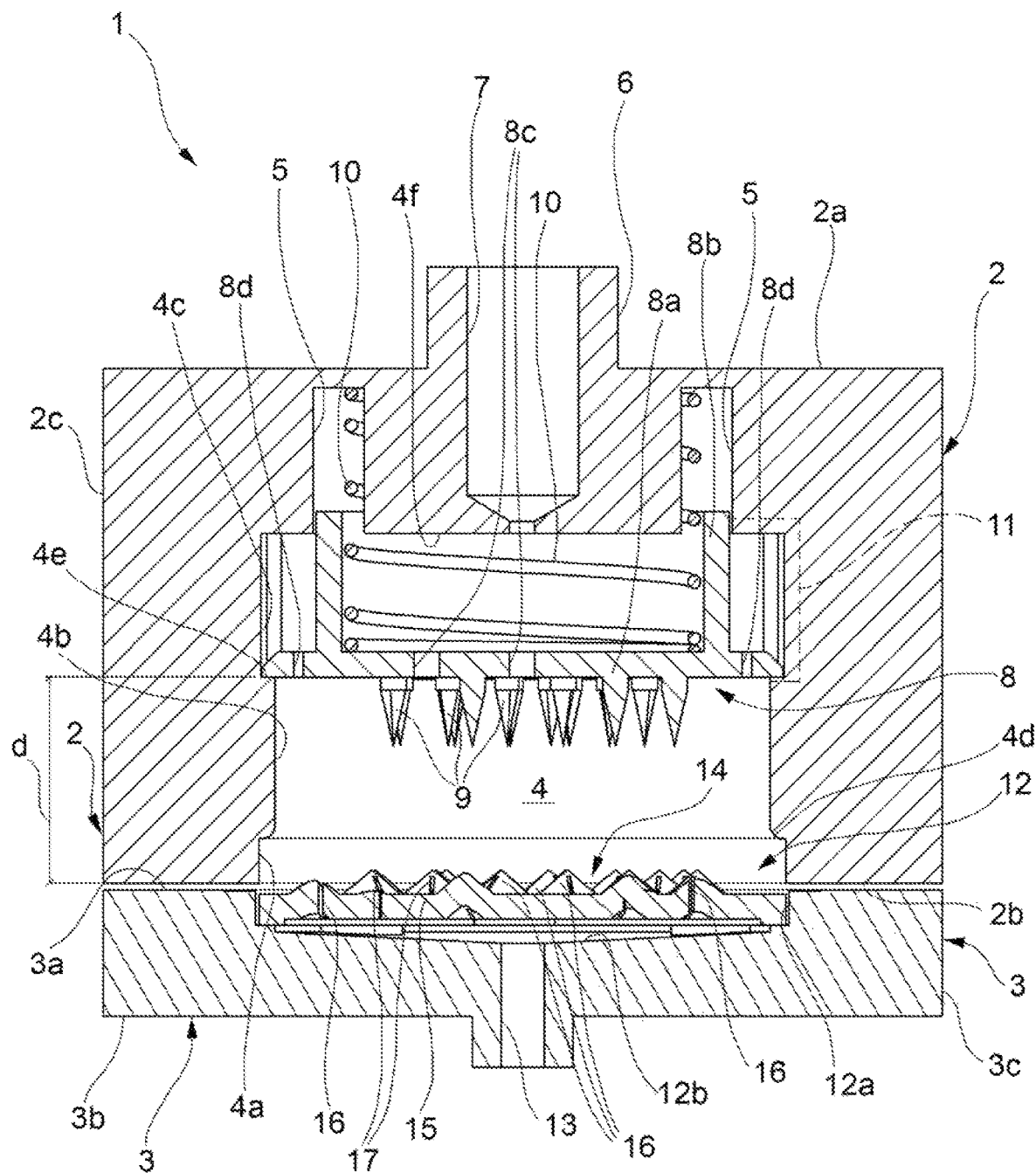
FIG. 2 is a axial section front view of the infusion assembly according to FIG. 1.

In particular, the recess 4 comprises a lower portion 4a, an overlying intermediate portion 4b of reduced diameter and a top portion 4c of similar diameter to that of the lower portion 4a (see in particular FIG. 2).

Advantageously, although not necessarily, the intermediate portion 4b of the recess 4 is slightly tapered upwardly and its lower end is connected to the portion 4a forming a rounded step 4d (FIG. 2).

The upper portion 4c of the recess 4 is joined to the intermediate portion 4b forming an annular shoulder 4e (see, again, FIG. 2).

In the upper wall of the recess 4, which defines the ceiling 4f of the recess, an annular groove 5 is formed.

In the particular embodiment illustrated, the groove 5 is coaxial with the recess 4 and has a reduced diameter greater than the diameter of the upper portion 4c of said recess 4.

From the upper flat surface 2a of the capsule-holder 2, a tubular appendage 6 extends upwards wherein an axial duct 7 is made, which tapers downward and flows into the upper portion 4c of the recess 4.

As will be better described below, when in use, the conduit 7 allows a flow of fluid under pressure (for example hot water and/or steam) to be fed towards the recess 4, for the preparation of a beverage.

In the recess 4 and in the annular groove 5 of the capsule-holder 2, a piercing member, indicated collectively at 8, is mounted in an axially translatable way.

In the particular embodiment illustrated, the piercing member 8 comprises an essentially circular plate-shaped portion 8a, from the lower face from which extends a plurality of piercing points 9.

From the upper surface or face of the plate-like portion 8a, a cylindrical annular portion 8b extends upwards, extending partly into the annular groove 5.

As best seen, for example, in FIG. 2, the plate-like portion 8a of the piercing member 8 extends radially also to the outside of the tubular portion 8b.

A coil spring 10 extends in part into the groove 5 of the capsule-holder 2 and in part within the tubular or annular portion 8b of the piercing member 8.

The spring 10 tends to push the piercing member 8 in the direction of the cooperating body 3.

When no capsule is positioned in the recess 4 for the preparation of a beverage, the spring 10 maintains the piercing member 8 in the position illustrated in FIGS. 1 and 2, wherein the peripheral part of its plate-like portion 8a presses against the annular stop shoulder 4e, which defines a predetermined axial position of rest In this condition, the distance d (FIG. 2) between the plate-like portion 8a of the piercing member 8 and the lower flat surface or face 2b of the capsule-holder 2 is less than the axial size or height of the capsules for use with the infusion assembly 1, as will be described better below.

Between the region of the recess 4 above the plate-shaped portion 8a of the piercing member 8 and the underlying portion of said recess, a condition of hydraulic communication is made.

Such permanent condition of communication is obtained through one or more steps, for example, one or more of the following:

in the plate-shaped portion 8a of the piercing member 8, radially inside of the annular portion 8b of the piercing member, one or more through openings 8c are made;

in the part of the plate-shaped portion 9a of the piercing member 8 that protrudes radially beyond the annular portion 8b, one or more through openings or slots 8d are made;

between the piercing member 8 and the walls of the recess 4 and the groove 5 are provided radial clearances adapted to allow the communication of fluid (liquid) between the regions above and below said piercing member 8; and at least one by-pass passage 11 (FIG. 2) is made in the body of the capsule-holder 2, between the portion 4b of the recess 4 below the piercing member 8 and the top part of the upper portion 4c of such recess and/or the groove 5.

In the cooperating body 3, starting from its top flat surface or face 3a, a recess 12 extends downwards which in the particular embodiment illustrated includes an essentially cylindrical upper portion 12a, followed by a frustoconical underlying portion 12b, which communicates with an axial central supply passage 13.

In the upper portion 12a of the notch or recess 12 of the body 3 is positioned a second piercing member 14, of a per se known type. Such a piercing member 14 comprises a plate-shaped body 15 which forms on the upper part a plurality of piercing points 16 crossed by respective through openings 17 to permit in use the outflow of the beverage made in a capsule towards the dispensing conduit 13, as will be described better below.

Figure 3:
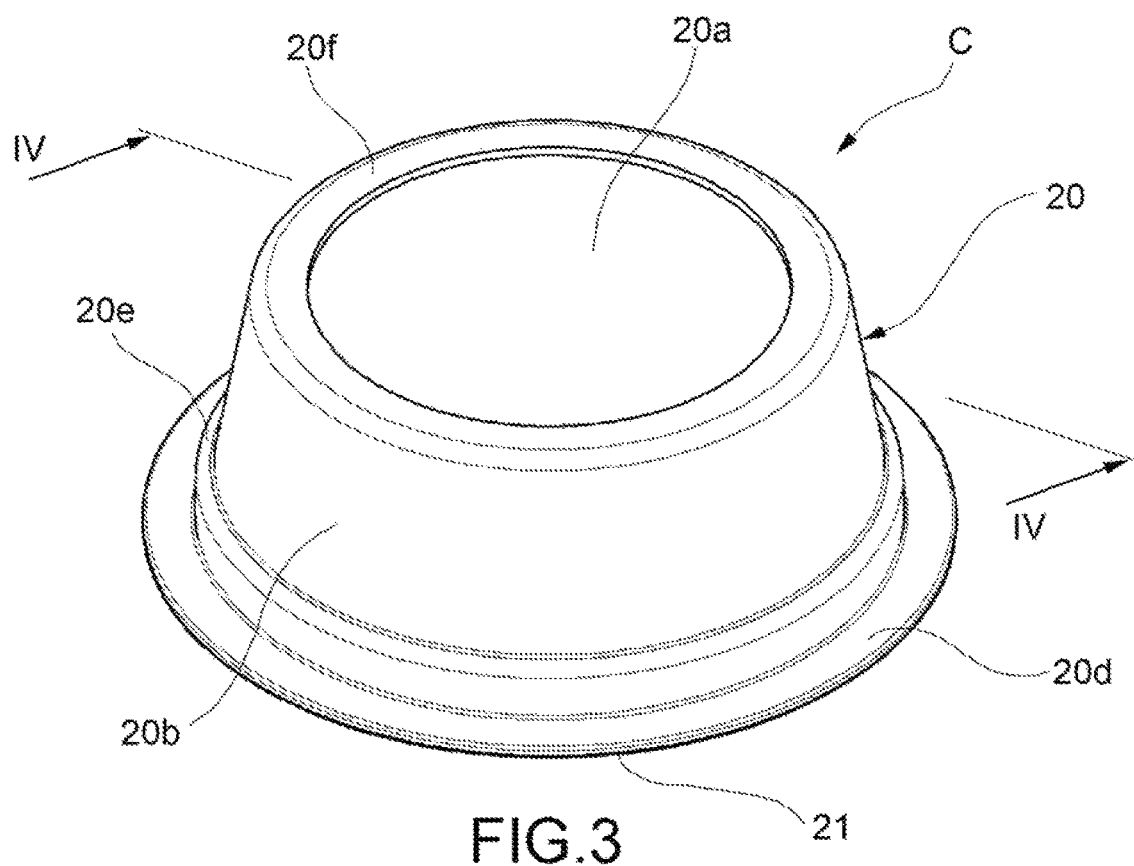
FIG. 3 is a perspective view of a capsule used for the preparation of a beverage having an infusion assembly according to the preceding figures.
Figure 4:
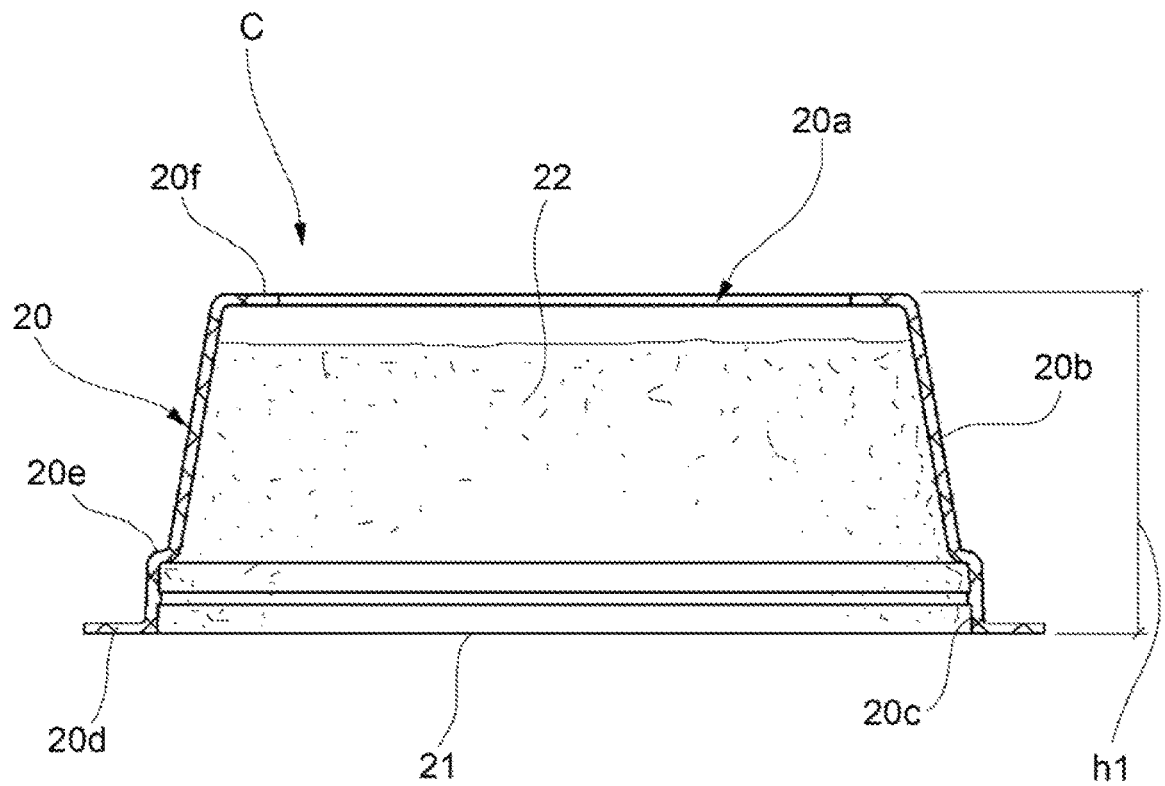
FIG. 4 is a section view along the line IV-IV of FIG. 3.

FIGS. 3 and 4 illustrate by way of example a first type of capsule C for the preparation of a beverage which is part of the system according to the present invention.

The capsule C shown in FIGS. 3 and 4 comprises a cup-shaped body 20 having a bottom wall 20a and a side wall 20b. The latter, on the side opposite to the bottom wall 20a, defines an opening 20c around which extends a flange-like formation 20d protruding transversely towards the outside.

The capsule C also comprises a cover 21, in liquid-tight connection, for example by heat sealing, to the flange-like formation 20d of the body 20, for closing the opening 20c.

In the capsule C is contained a quantity 22 of a substance for the preparation of a beverage, for example ground roasted coffee. Such substance may partially or completely fill the capsule C. In addition, such substance may be compressed and a vacuum may be formed in the capsule, for example in accordance with the solution described in International patent application WO 2008/015642 in the name of the same Applicant.

In the illustrated embodiment, the side wall 20b of the cup-shaped body 20 in the vicinity of the flange-like formation 20d forms a perimeter step 20e, from which said side wall 20b gradually tapers, in the manner of a truncated cone, in the direction of the bottom wall 20a.

Said bottom wall 20a of the cup-shaped body 20 advantageously has a central portion of reduced thickness, surrounded by a relatively thicker annular peripheral portion 20f. In the illustrated embodiment, the annular peripheral portion 20f protrudes toward the outside relative to the central circular portion of the bottom wall 20a, but in alternative embodiments, it may instead protrude toward the inside of the capsule.

Also the side wall 20b of the cup-shaped body 20 has a thickness greater than that of the central portion of the bottom wall 20a to confer to the body 20 an adequate resistance to compression in the axial direction.

In principle, the body 20 and the cover 21 of the capsule C may be made in a manner known per se with different materials, such as plastic materials possibly with materials added to form a barrier against the penetration of oxygen and moisture, metallic materials, composite materials, etc.

The capsule C may also be made of compostable materials, for example in accordance to the solution described in International patent application WO2016103104 in the name of the same Applicant, or with traditional, non-compostable materials but still with the form and structural features described in that application.

Capsule C described above, with reference to FIGS. 3 and 4, has an axial size or height h1 (FIG. 4), defined as the distance between the substantially parallel planes wherein extends the outer surface of the peripheral annular portion 20f of the bottom wall and the plane wherein extends the annular peripheral portion of the cover 21 coupled to the flange 20d of the cup-shaped body 20.

With reference to FIGS. 3 and 4, the height h1 of the capsules of the type according to FIGS. 3 and 4 is greater than the distance d which at rest separates the lower face of the plate-shaped portion 8a of the piercing member 8 from the lower end surface 2b of the capsule-holder 2 of the infusion assembly 1.

Figure 5:
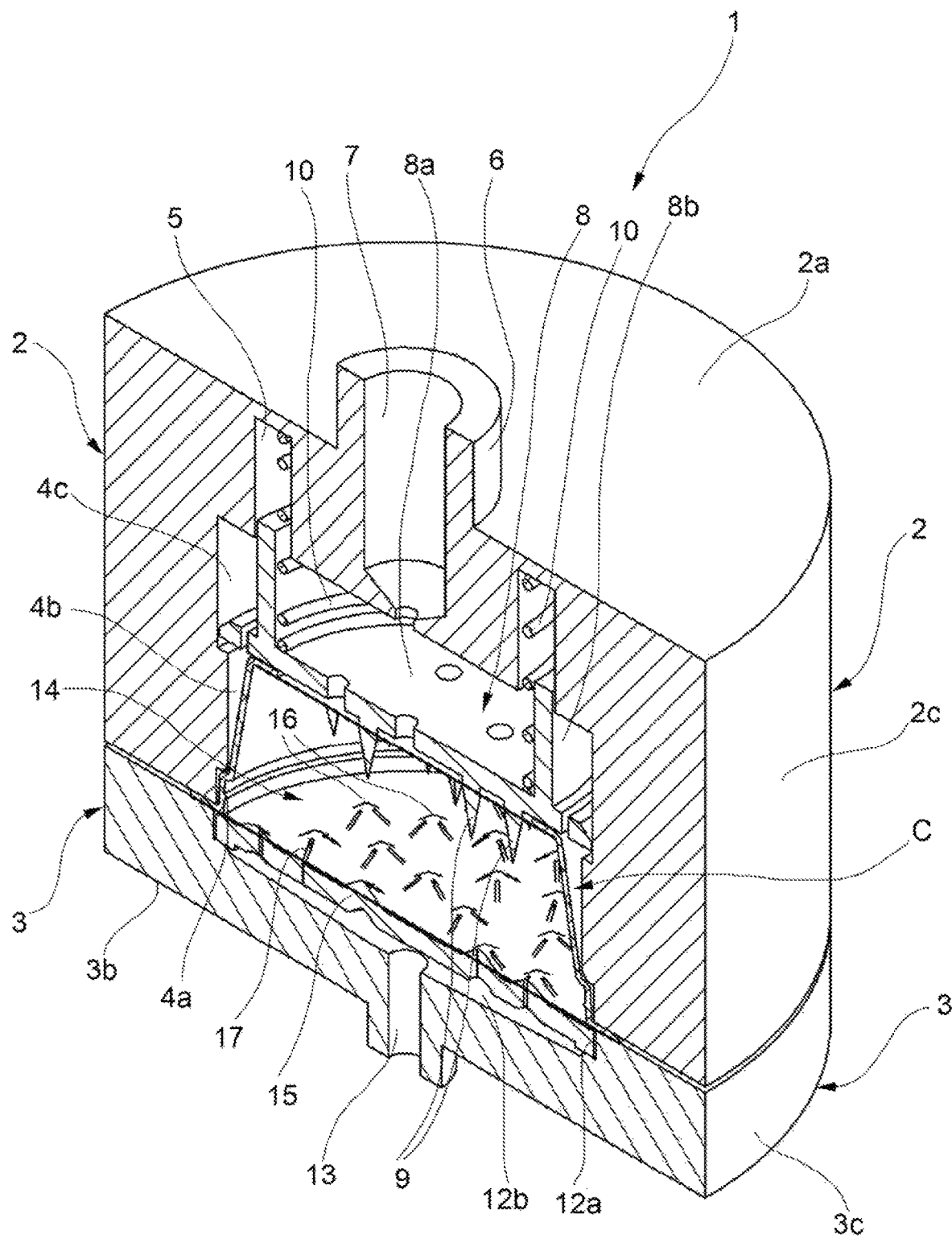
FIG. 5 is a similar view to that of FIG. 1 and shows the infusion assembly wherein a capsule of the type according to FIGS. 3 and 4 has been positioned and locked.
Figure 6:
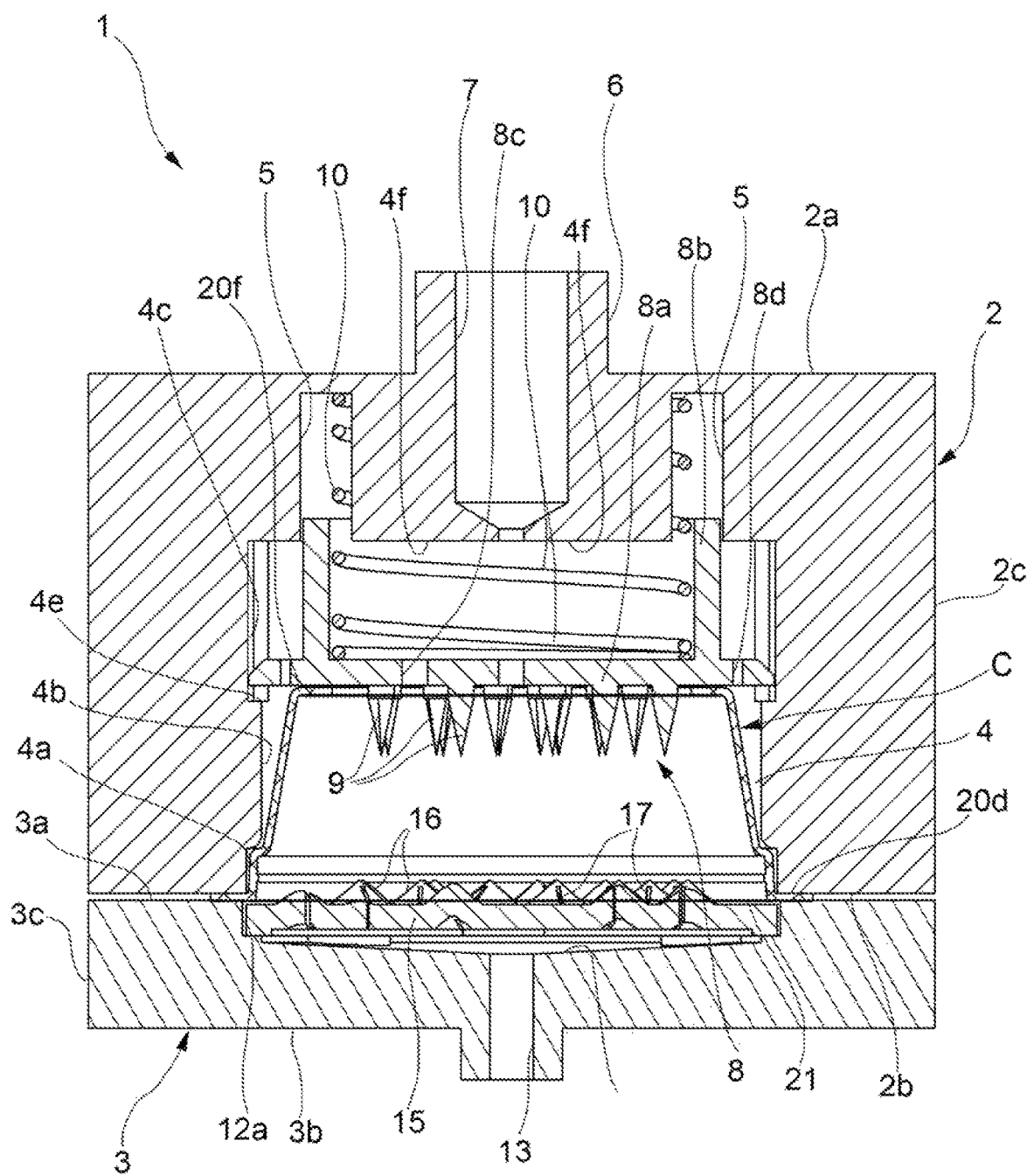
FIG. 6 is an axial section front view corresponding to the perspective view of FIG. 5.

In a manner known per se, the capsule-holder 2 and the cooperating body 3 of the infusion assembly 1 are likely to be arranged in an open configuration wherein the mutual distance is such as to allow the positioning of a capsule C therebetween, with the bottom wall 20a facing the inside of the capsule-holder 2, i.e. towards the piercing member 8, and a closed configuration for preparing a beverage through the capsule C, positioned and locked with a liquid-tight seal therebetween, as is shown in FIGS. 5 and 6.

When a capsule C enters the capsule-holder 2 of the assembly 1 in the open configuration, it, along with its bottom wall, is in contact with the points 9 of the piercing member 8. When the assembly 1 passes to the closed configuration, these points 9 penetrate through the relatively thinner central portion of the bottom wall of the capsule C and the annular peripheral portion 20f of the bottom wall of the capsule C abuts against the lower surface of the plate-like portion 8a of the piercing member 8.

Since, as mentioned previously, the height h1 of the capsule C is greater than the distance d (FIG. 2), the piercing member 8 is then moved away from the stop shoulder 4e (FIG. 6), by the action of the spring 10.

In the closed configuration of the infusion assembly 1, the flange-like formation 20d and the cover 21 of the capsule C are locked in a liquid-tight seal between the capsule-holder 2 and the associated cooperating body 3 (see again FIG. 6).

In the embodiment illustrated in FIGS. 5 and 6 in the closing phase of the infusion assembly 1, the cover 21 of the capsule C is torn by the points 16 of the piercing member 14 on the body 3.

Furthermore, in a manner known per se, the cover 21 of the capsule C may tear, not when the infusion assembly 1 closes, but rather subsequently, due to the effect of the pressure of the fluid injected into the capsule C through the tears of the bottom wall of the latter made by the piercing member 8.

In the closed infusion assembly 1, a pressurized fluid, for example hot water, is fed to the recess 4, through the supply conduit 7 arranged in the capsule-holder 2.

This fluid also strikes the surface of the piercing member 8 and in particular both the upper surface and the lower surface of its plate-like portion 8a.

This fluid also reaches the interspace defined between the central portion of the bottom wall of the capsule C and the lower surface or face of the plate-shaped portion 8a of the piercing member 8 and penetrates inside the capsule C through the tears made in this bottom wall.

Thus, the pressurized fluid comes into contact with the substance contained in the capsule C. The gradually prepared beverage flows from the capsule C through the passages 17 made by the points 16 of the piercing member 14 on the cooperating body 3.

The beverage then reaches the outlet conduit 13, from which, in a manner known per se, it may be conveyed towards a collection container, such as a cup or the like.

As mentioned previously, during the preparation of the beverage, the forces exerted by the pressure of the fluid on the piercing member 8 are in substantial equilibrium between them, to which the piercing force of the bottom wall of the capsule C is determined substantially by only the coil spring 10.

During dispensing, also the capsule C is substantially in a hydrostatic condition.

The infusion assembly 1 described above is also suitable for use with additional types of capsules, different from the type according to the FIGS. 3 and 4 essentially due to the fact of having a greater axial size or height.

Figure 7:
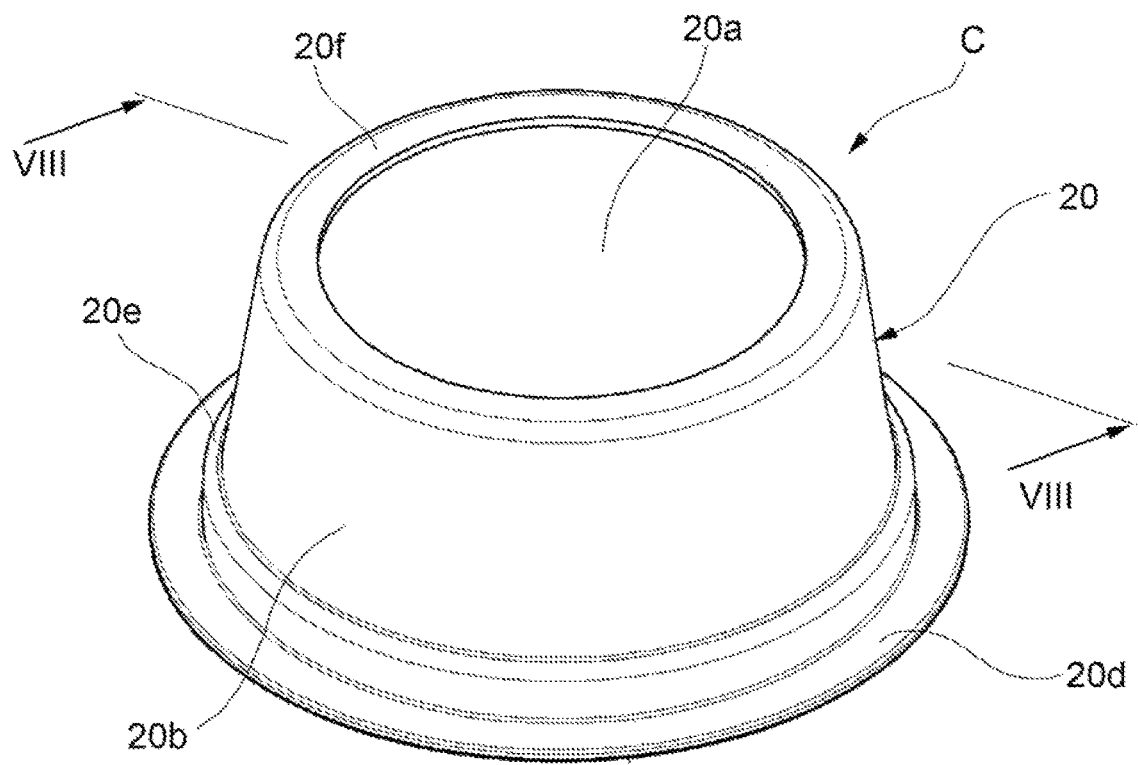
FIG. 7 is a perspective view of another capsule for use in an infusion assembly according to FIGS. 1 and 2.
Figure 8:
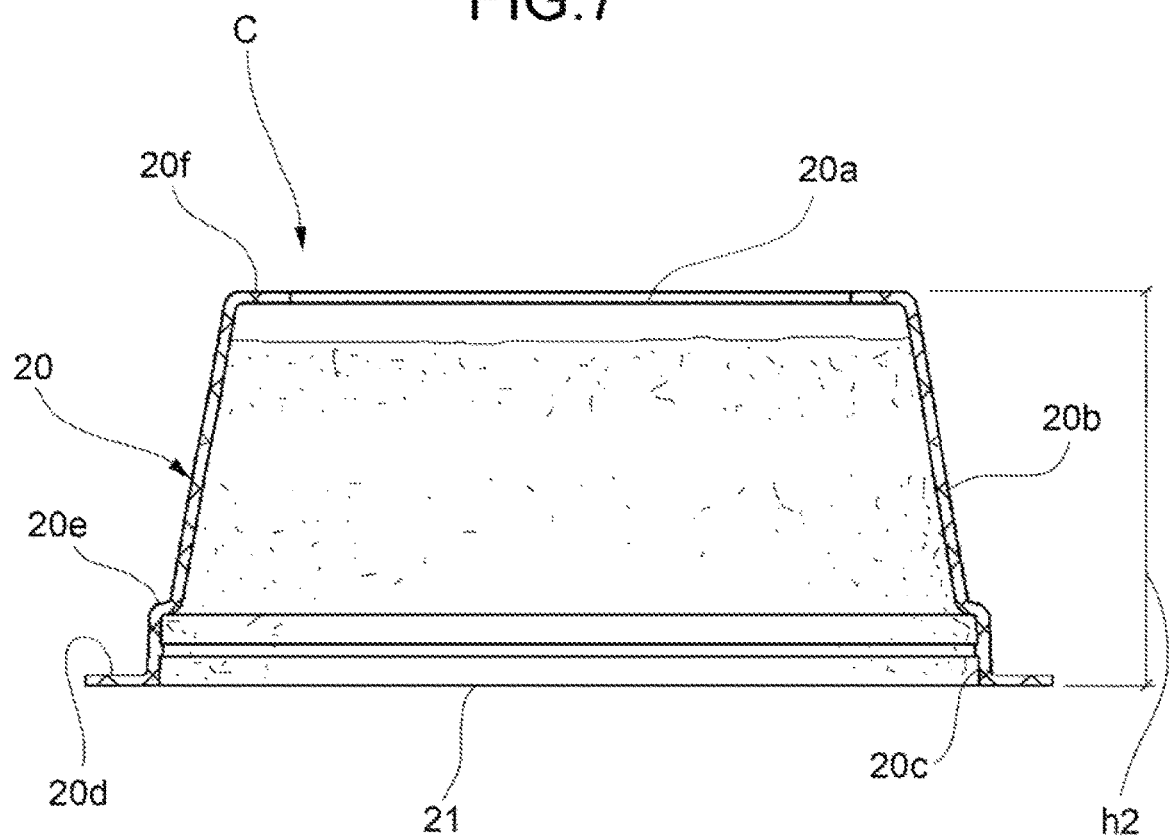
FIG. 8 is a section view along the line VIII-VIII of FIG. 7.

In FIGS. 7 and 8, a second type of capsule is illustrated with an axial size or height h2 greater than h1. In FIGS. 7 and 8, the same alphanumeric references used previously have been attributed again to the parts and elements already described.

Figure 9:
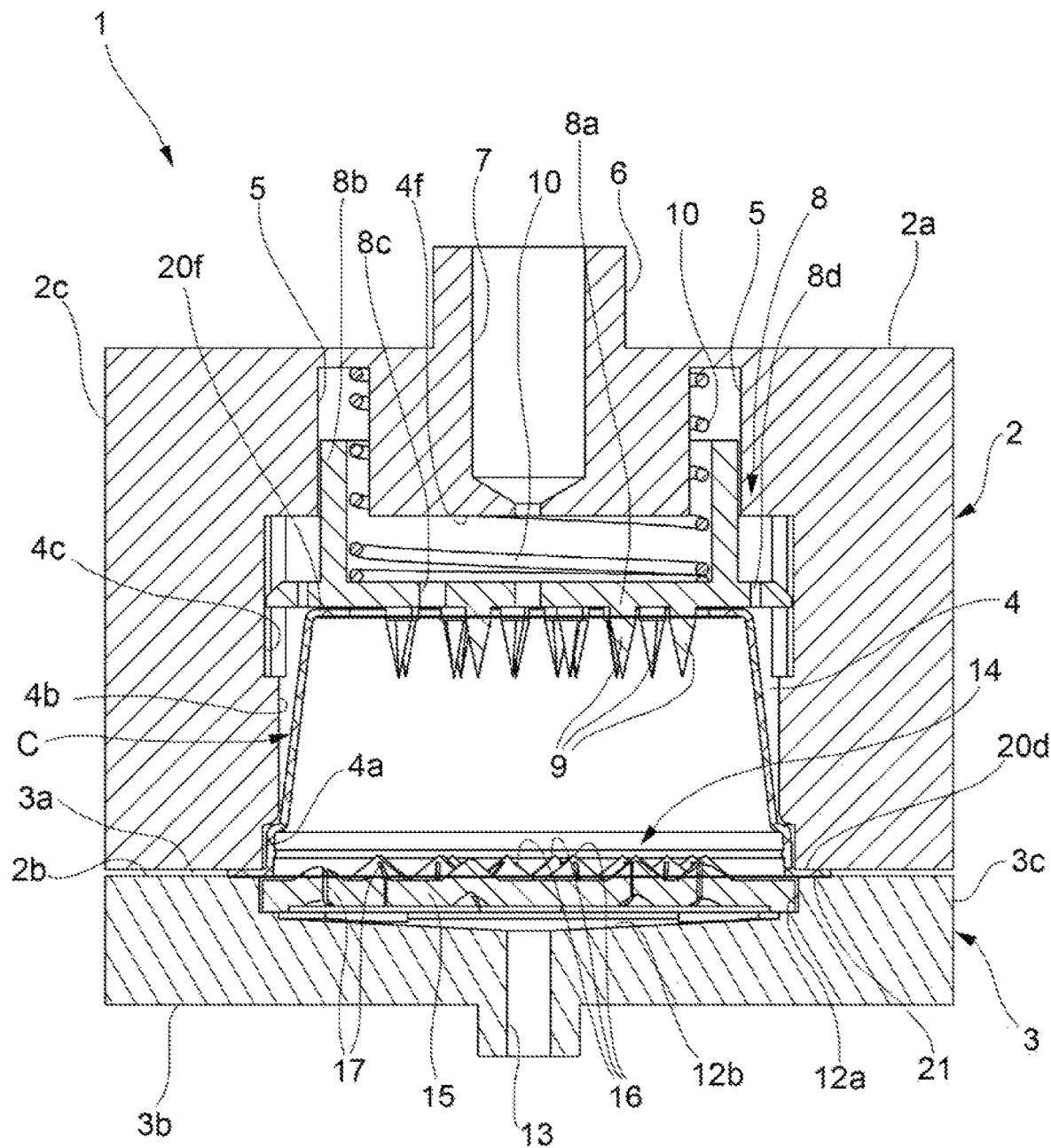
FIG. 9 is a sectional view of the infusion assembly of FIG. 1, wherein a capsule according to FIGS. 7 and 8 is positioned and locked.

The capsule according to FIGS. 7 and 8 can be positioned and locked in the infusion assembly 1 previously described in such a way that in the closed condition of such assembly the configuration shown in FIG. 9 is achieved: in this case also, the flange-like formation 20d of the capsule C and the associated peripheral portion of the cover 21 are locked in a liquid-tight seal between the capsule-holder 2 and the associated cooperating body 3. The bottom wall of the capsule C and in particular its annular peripheral portion 20f, is engaged against the plate-like portion 8a of the piercing member 8, which is now maintained in a more raised position, with respect to the configuration of FIG. 6, below the action of the spring 10 which is more compressed.

Figure 10:
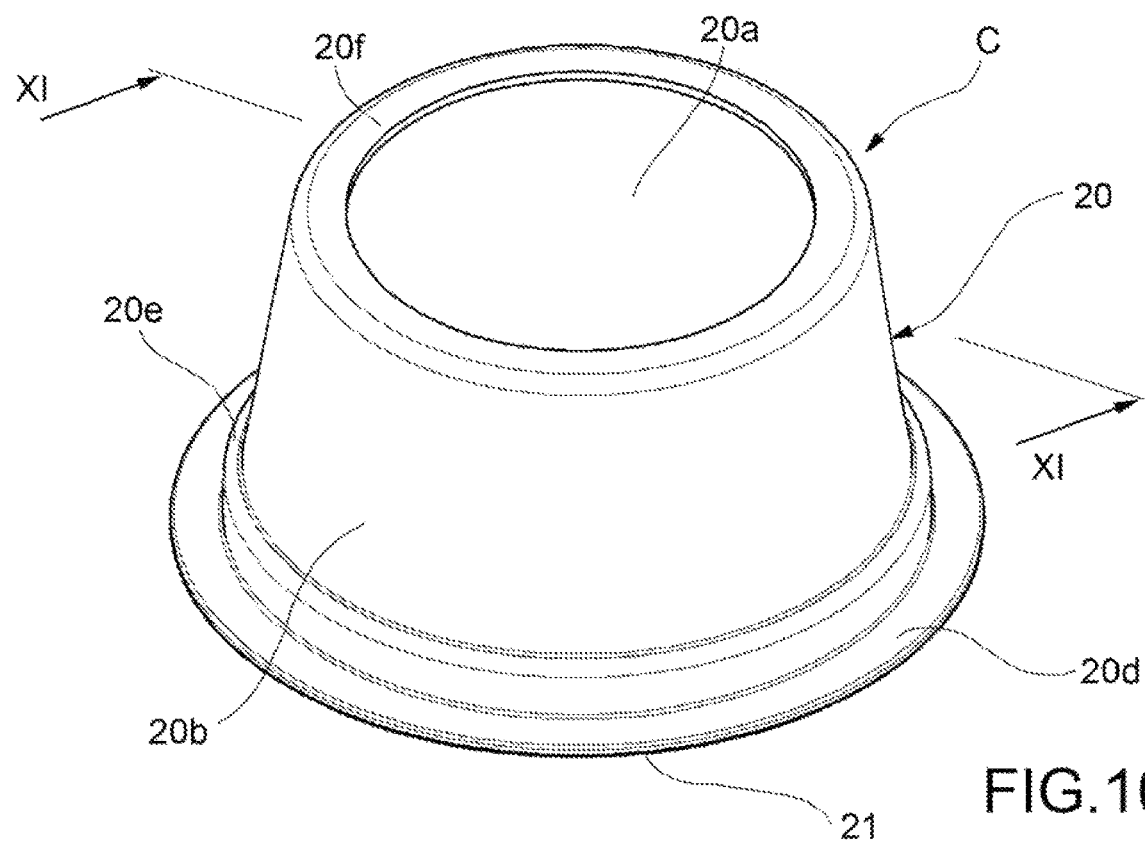
FIG. 10 is a perspective view of a further type of capsule for use in the infusion assembly of FIG. 1.
Figure 11:
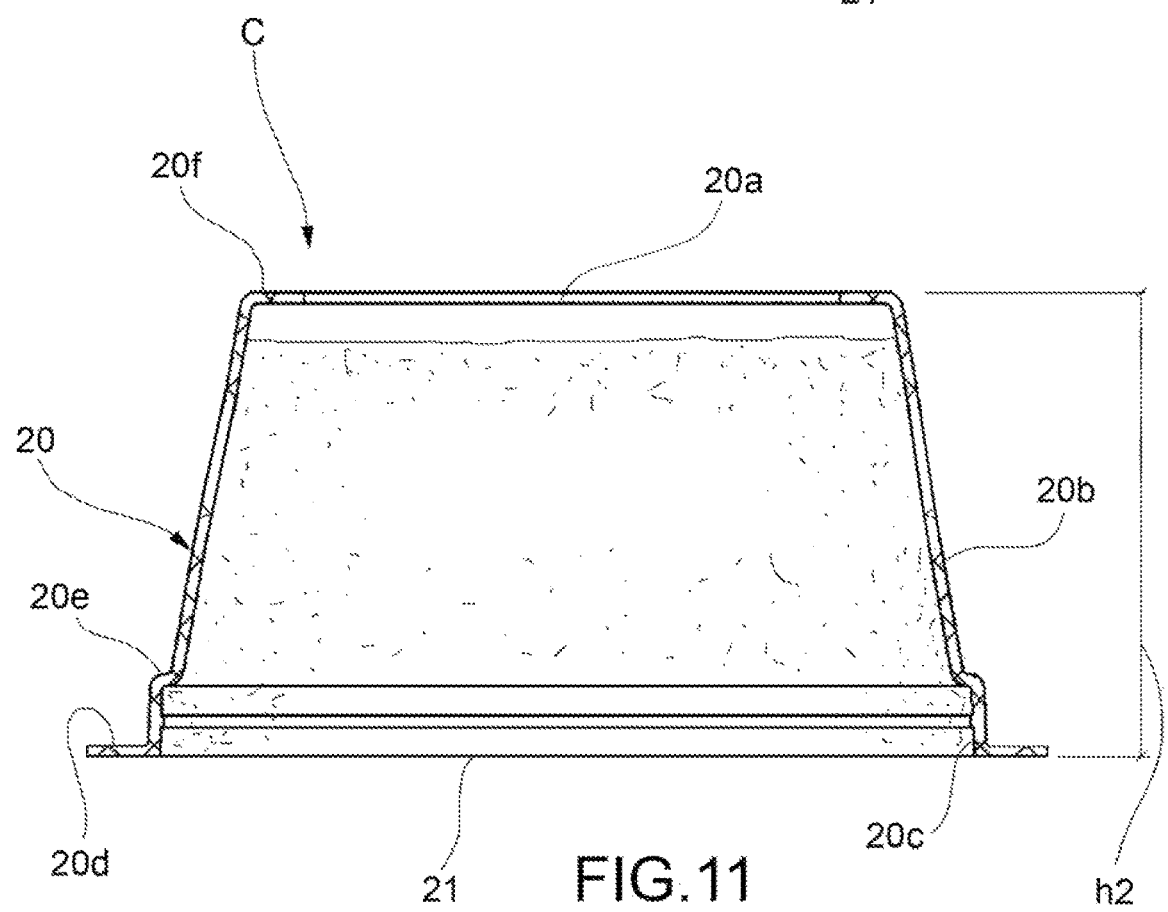
FIG. 11 is a section view along the line XI-XI of FIG. 10.

FIGS. 10 and 11 illustrate a third type of capsule, similar to those described previously, from which it differs essentially in that it has a greater axial size or height h3 greater than h2 and h1.

Figure 12:
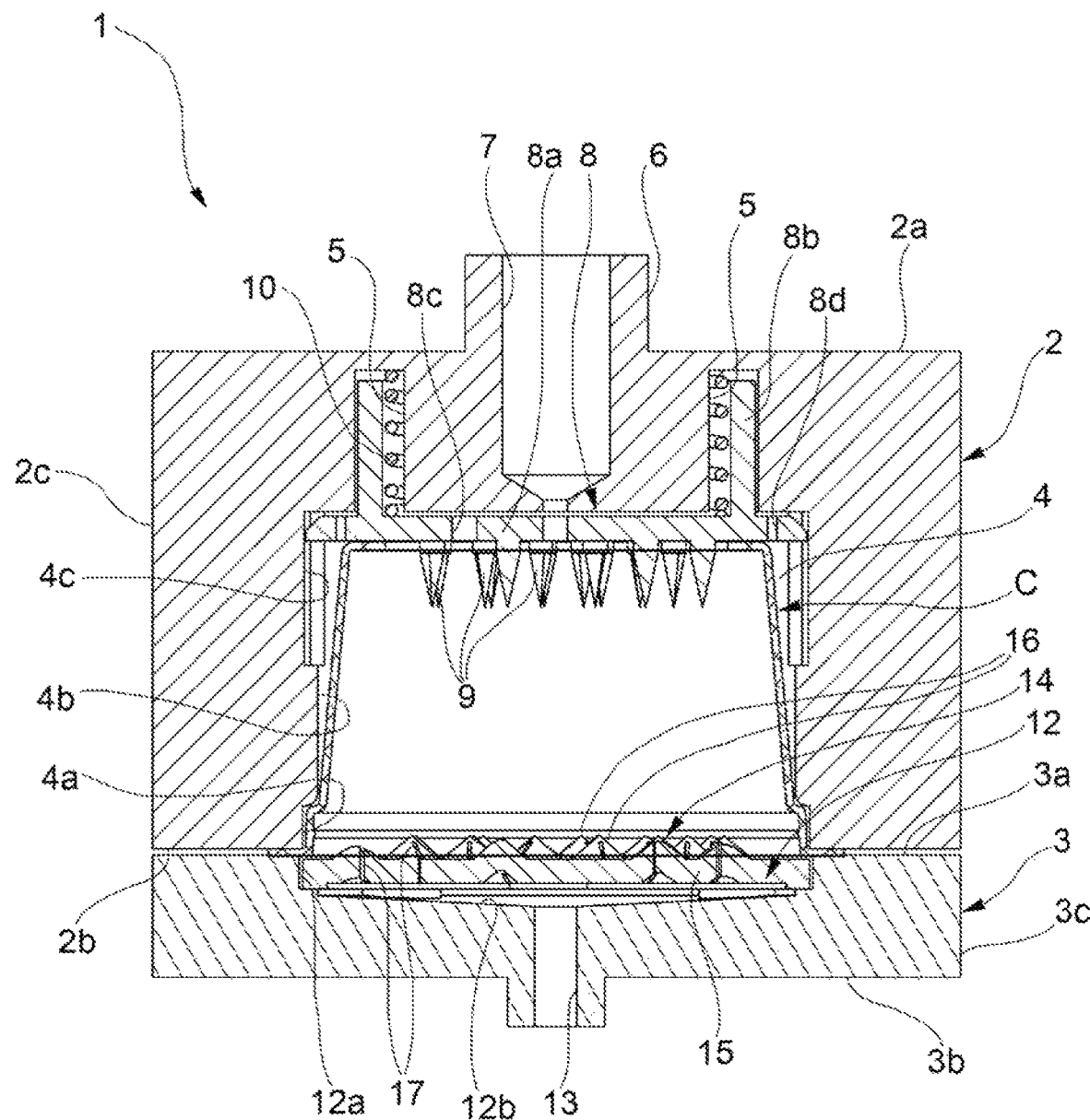
FIG. 12 is an axial section view of the infusion assembly of FIG. 1, wherein a capsule according to FIGS. 10 and 11 is positioned and locked.

FIG. 12 shows the configuration of the infusion assembly 1 in the closed condition, in the case of using a capsule C according to FIGS. 10 and 11.

The various types of capsules suitable for use in an infusion assembly according to the invention can in general contain the same or different substances, for the preparation of many different beverages.

From the foregoing description, it is evident to those skilled in the art that, in an infusion assembly according to the present invention, various types of capsules may be used, for which the requirements for compatibility are essentially limited to the geometry of the flange portion and the cover, which must be such as to ensure the seal between the capsule-holder 2 and the body 3 in the closed condition, and on the overall dimensions of the cup-shaped body 20, which must be compatible with the dimensions of the recess 4 of the capsule-holder and with the maximum travel of the piercing member 8 of the capsule-holder 2.

Although in the drawings accompanying the present description the infusion assembly 1 is always illustrated as operating in a substantially vertical arrangement, it is clear that this assembly is suitable for operation also positioned on the horizontal or oblique axis.

Furthermore, the systems for loading the capsules in the infusion assembly, the clamping of the assembly and discharge of the used capsules may be of any type known per se, automatic or manual.

Advantageously, the capsules used in the infusion assembly according to the invention may be made in such a way as to be suitable for use also with other types of infusion assemblies or machines for preparing beverages of the per se known type and already present on the market.

Advantageously, such capsules wherein the bottom wall 20a and the cover 21 have equal or similar tearing features for which an infusion assembly wherein liquid under pressure is introduced through the cover rather than through the bottom wall may also be used.

Naturally, without altering the principle of the invention, the embodiments and the details of construction may vary widely with respect to those described and illustrated purely by way of non-limiting example, without thereby departing from the scope of the invention as defined in the appended claims.

The invention claimed is:

1. System for the preparation of a beverage comprising an infusion assembly (1) and a capsule (C),
    the capsule (C) comprising
        a cup-shaped body (20) of a material impermeable to liquids, with a bottom wall (20a, 20f), which is tearable for introducing into the capsule (C) a flow of a pressurized fluid, with a side wall (20b) defining an opening (20c) around which a flange (20d) protruding transversely towards the outside extends, and with a cover (21), which is tearable for the outflow of the beverage, the cover (21) being connected in a liquid-tight manner with said flange (20d), and
        a quantity of a substance (22) for the preparation of the beverage contained in said cup-shaped body (20);
    the infusion assembly (1) comprising
        a capsule-holder (2) and a cooperating body (3), at least one of which is movable with respect to the other between an open configuration for positioning the capsule (C) between the capsule-holder (2) and the cooperating body (3), and a closed configuration for preparing the beverage through the capsule (C) positioned and clamped in a liquid-tight manner between the capsule-holder (2) and the cooperating body (3);
    wherein in the capsule-holder (2) there is defined a recess (4) for receiving the capsule (C) with said bottom wall (20a, 20f) facing to the inside of the capsule-holder (2) and wherein there is defined a first piercing element (8) provided with at least one piercing point (9) adapted to penetrate through said bottom wall (20a) of said capsule (C); the capsule-holder (2) being provided with supply means (7) for supplying a flow of a fluid to be introduced into said capsule (C) through the passage torn in said bottom wall (20a) of the capsule (C) by said at least one point (9);
    wherein in the cooperating body (3) there is defined a dispensing conduit (13) for the beverage and a second piercing element (14) is provided, having at least one point (16) adapted to penetrate through the cover (21) of the capsule (C) and to allow the outflow of the beverage from the capsule (C) towards said dispensing conduit (13);
    wherein in the capsule-holder (2) there are provided fluid communication means (8c; 8d; 11) which put into communication a region upstream with a region downstream of the first piercing member (8) in the operational path of said flow of fluid, such that during the preparation of a beverage the pressurized fluid introduced into said recess (4) of the capsule-holder (2) exerts on the first piercing member (8) a resulting force lower than a predetermined value towards the capsule (C), and in particular a resulting force which is null, said first piercing member (8) being mounted in the recess (4) of the capsule-holder (2) such as to be movable under the action of an associated resilient means (10) tending to displace it towards the cooperating body (3); and
    wherein the bottom wall (20a, 20f) of the cup-shaped body (20) of the capsule (C) has a central portion of reduced thickness, surrounded by a relatively thicker annular peripheral portion (20f), and the side wall (20b) of the cup-shaped body (20) of the capsule (C) has a thickness greater than that of said central portion of the bottom wall (20a, 20f) of the cup-shaped body (20) of the capsule (C), and wherein said recess (4) of the capsule-holder (2) has a shape such that when the capsule (C) is clamped between the capsule-holder (2) and the associated cooperating body (3), an annular interspace is defined between the lateral wall (20b) of the cup-shaped body (20) of said capsule (C) and a wall (4b) of said recess (4) of the capsule-holder (2).

2. System according to claim 1, wherein said fluid communication means comprises at least one of the following:

at least one through opening (8c; 8d) in the first piercing member (8);

at least one by-pass passage (11) defined between a wall (4c) of said recess (4) of the capsule-holder (2) and the first piercing member (8); and at least one by-pass passage (11) provided in the capsule-holder (2), between the region upstream and the region downstream of said first piercing member (8).

3. System according to claim 1, wherein said capsule (C) is made with compostable materials.

4. System for the preparation of a beverage comprising an infusion assembly (1) and a capsule (C), the capsule (C) comprising a cup-shaped body (20) of a material impermeable to liquids, with a bottom wall (20a, 20f), which is tearable for introducing into the capsule (C) a flow of a pressurized fluid, with a side wall (20b) defining an opening (20c) around which a flange (20d) protruding transversely towards the outside extends, and with a cover (21), which is tearable for the outflow of the beverage, the cover (21) being connected in a liquid-tight manner with said flange (20d), and a quantity of a substance (22) for the preparation of the beverage contained in said cup-shaped body (20);

the infusion assembly (1) comprising a capsule-holder (2) and a cooperating body (3), at least one of which is movable with respect to the other between an open configuration for positioning the capsule (C) between the capsule-holder (2) and the cooperating body (3), and a closed configuration for preparing the beverage through the capsule (C) positioned and clamped in a liquid-tight manner between the capsule-holder (2) and the cooperating body (3);

wherein in the capsule-holder (2) there is defined a recess (4) for receiving the capsule (C) with said bottom wall (20a, 20f) facing to the inside of the capsule-holder (2) and wherein there is defined a first piercing element (8) provided with at least one piercing point (9) adapted to penetrate through said bottom wall (20a) of said capsule (C); the capsule-holder (2) being provided with supply means (7) for supplying a flow of a fluid to be introduced into said capsule (C) through the passage torn in said bottom wall (20a) of the capsule (C) by said at least one point (9);

wherein in the cooperating body (3) there is defined a dispensing conduit (13) for the beverage and a second piercing element (14) is provided, having at least one point (16) adapted to penetrate through the cover (21) of the capsule (C) and to allow the outflow of the beverage from the capsule (C) towards said dispensing conduit (13);

wherein in the capsule-holder (2) there are provided fluid communication means (8c; 8d; 11) which put into communication a region upstream with a region downstream of the first piercing member (8) in the operational path of said flow of fluid, such that during the preparation of a beverage the pressurized fluid introduced into said recess (4) of the capsule-holder (2) exerts on the first piercing member (8) a resulting force lower than a predetermined value towards the capsule (C), and in particular a resulting force which is null, said first piercing member (8) being mounted in the recess (4) of the capsule-holder (2) such as to be movable under the action of an associated resilient means (10) tending to displace it towards the cooperating body (3); and wherein the bottom wall (20a, 20f) of the cup-shaped body (20) of the capsule (C) has a central portion of reduced thickness, surrounded by a relatively thicker annular peripheral portion (20f), and the side wall (20b) of the cup-shaped body (20) of the capsule (C) has a thickness greater than that of said central portion of the bottom wall (20a, 20f) of the cup-shaped body (20) of the capsule (C)

wherein in the recess (4) of the capsule-holder (2) there are provided stop means (4e) capable, when in said recess (4) there is not positioned the capsule (C), of retaining the first piercing member (8) in a predetermined axial position wherein the distance of the first piercing member (8) from the inlet of said recess (4) is less than the axial size or height (h1; h2; h3) of the capsule (C), such that when the capsule (C) is positioned in said recess (4) and is clamped between the capsule-holder (2) and the cooperating body (3), said first piercing member (8) is moved away from said stop means (4e) against the action of said resilient means (10).

5. System according to claim 4, including capsules (C) of a plurality of different types having different axial sizes or heights (h1; h2; h3), wherein starting from said predetermined axial position the first piercing member (8) is displaceable in the recess (4) of the capsule-holder (2) to an extent such as to allow the positioning in said recess (4) of said capsules (C).

* * * * *